(12) United States Patent
De Salles

(10) Patent No.: US 7,513,048 B2
(45) Date of Patent: Apr. 7, 2009

(54) CHAIN SAW ATTACHMENT FOR A HAND DRILL

(76) Inventor: Marcio De Salles, Rua Engenheiro Aloisio Rocha, 145/101 - Bairro Buritis, Belo Horizonte/MG - CEP:30575-260 (BR)

( * ) Notice: Subject to any disclaimer, the term of this patent is extended or adjusted under 35 U.S.C. 154(b) by 249 days.

(21) Appl. No.: 11/432,535

(22) Filed: May 12, 2006

(65) Prior Publication Data

US 2006/0254064 A1 Nov. 16, 2006

(30) Foreign Application Priority Data

May 13, 2005 (BR) .................................. 8501248

(51) Int. Cl.
*B23B 51/00* (2006.01)
*B23D 57/02* (2006.01)

(52) U.S. Cl. .............................. 30/500; 30/122; 30/381

(58) Field of Classification Search .................... 30/500, 30/381–387, 122, 123.4
See application file for complete search history.

(56) References Cited

U.S. PATENT DOCUMENTS

| 3,039,502 | A | * | 6/1962 | Spivey | ........................ 83/802 |
| 4,321,838 | A | * | 3/1982 | Feldman | ...................... 30/122 |
| 4,625,783 | A | * | 12/1986 | Notaras et al. | ................. 30/382 |
| 5,239,758 | A | | 8/1993 | Lindell | |
| 5,875,826 | A | * | 3/1999 | Giousos | .................. 144/136.95 |

* cited by examiner

*Primary Examiner*—Stephen Choi
(74) *Attorney, Agent, or Firm*—Clark & Brody

(57) ABSTRACT

It refers to an accessory, which provides an electric or battery powered hand drill with the additional function of a saw, this accessory is basically formed by an attachment piece to a hand drill and a shaft system, conical gears and a pinion, which start a chain saw mechanism. It has a handle and a shield for the pinion, whose extent presses the lids of the gearbox.

3 Claims, 6 Drawing Sheets

DRAWING 1
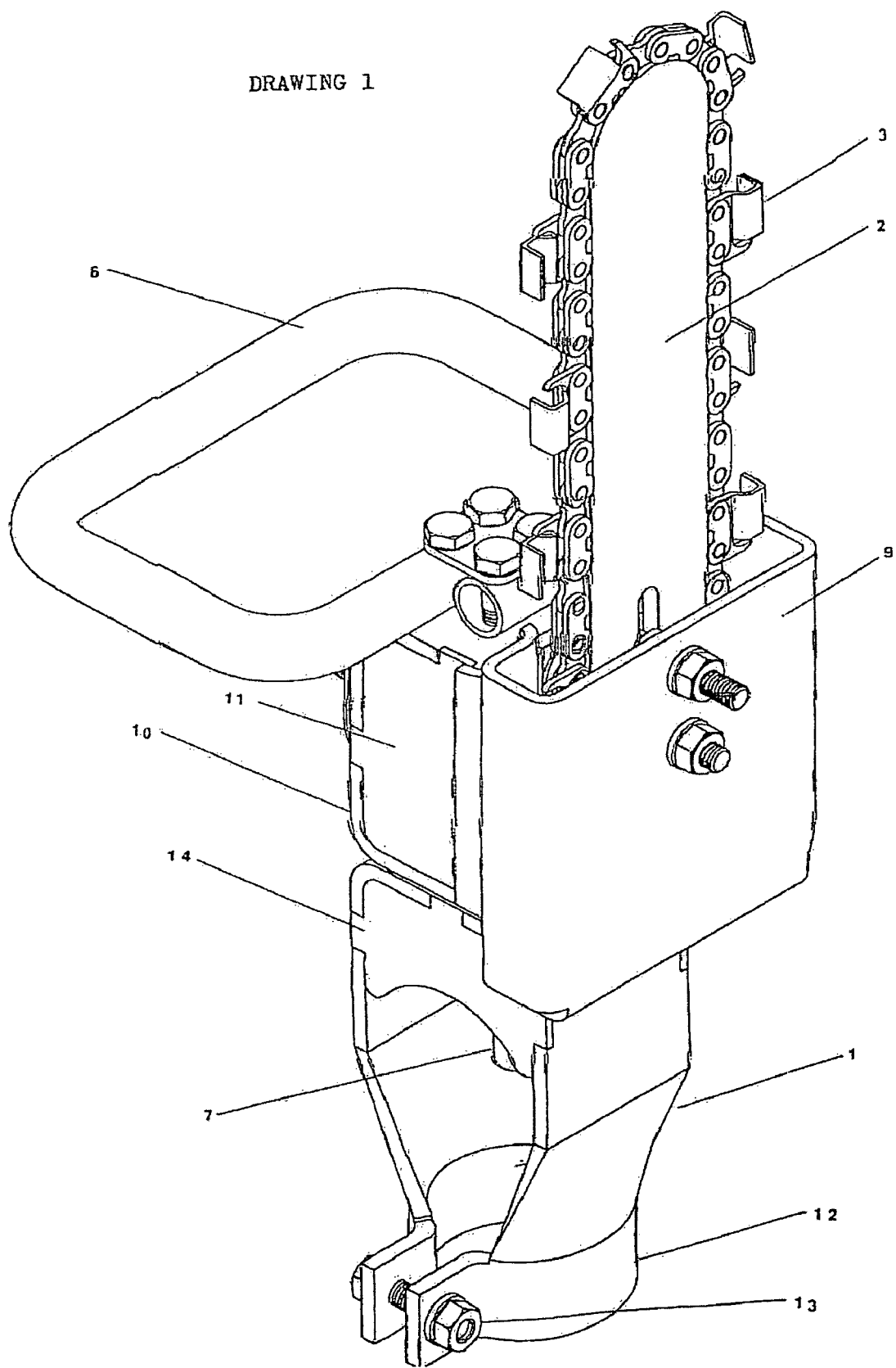

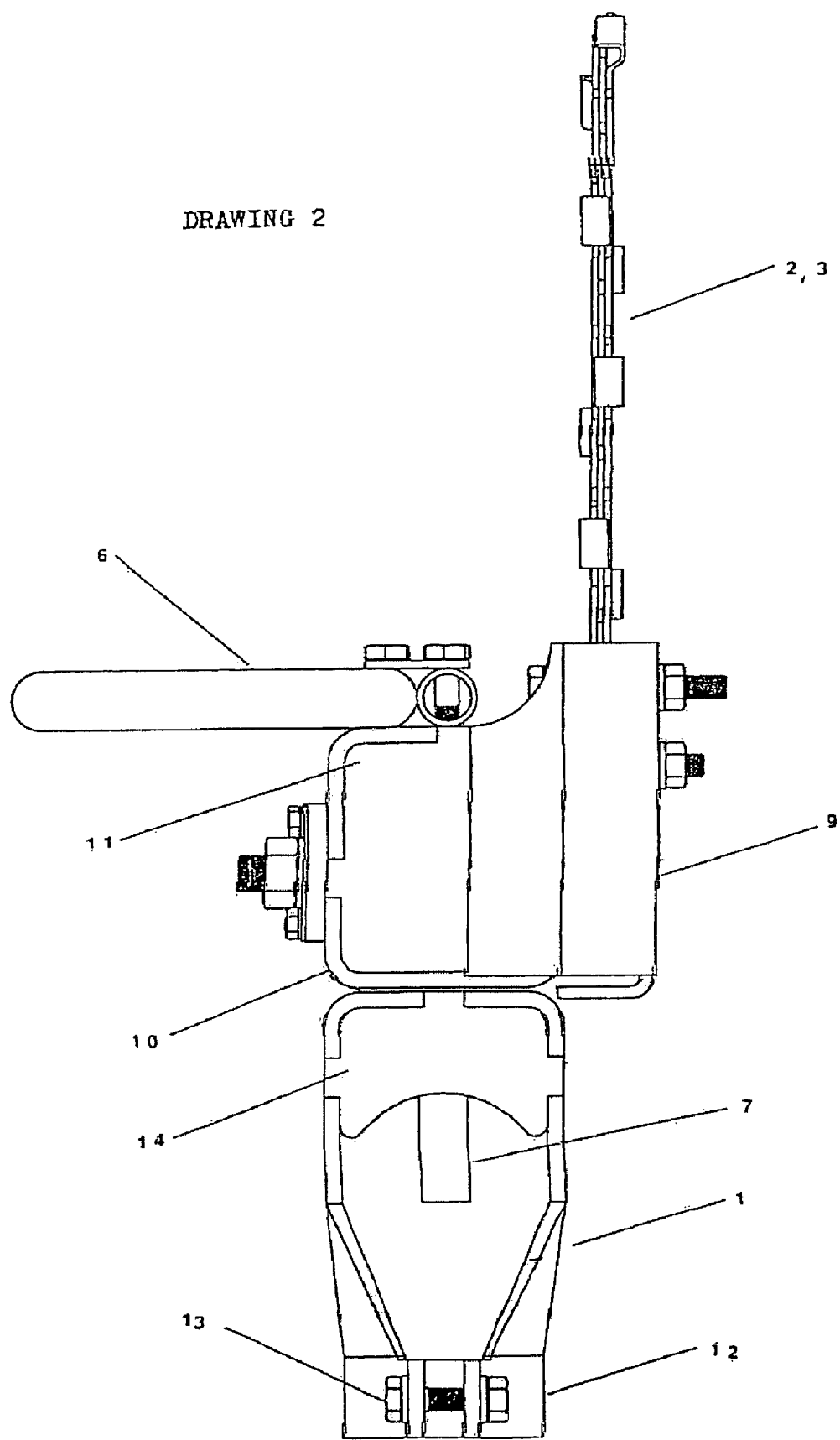

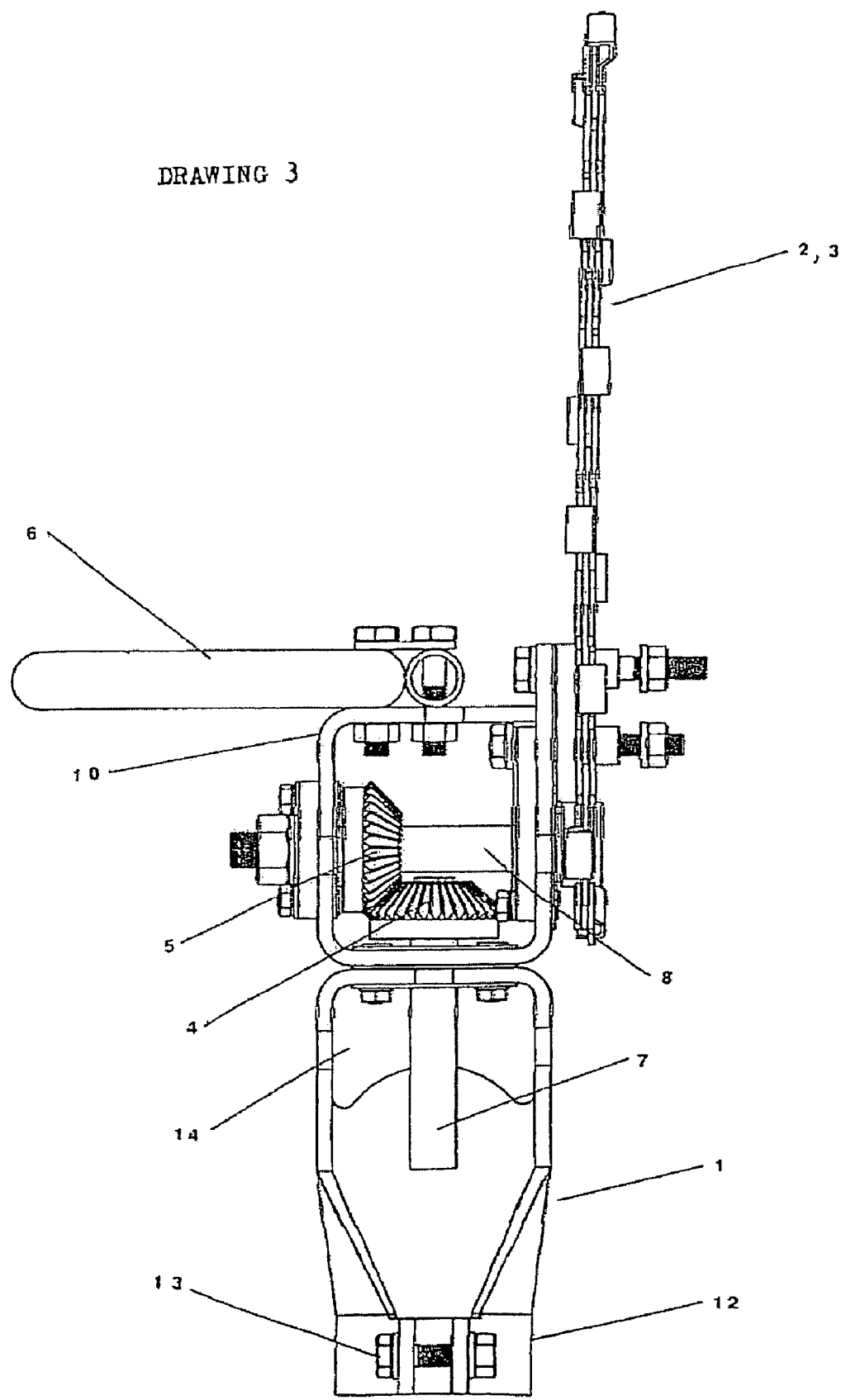
DRAWING 3

DRAWING 4
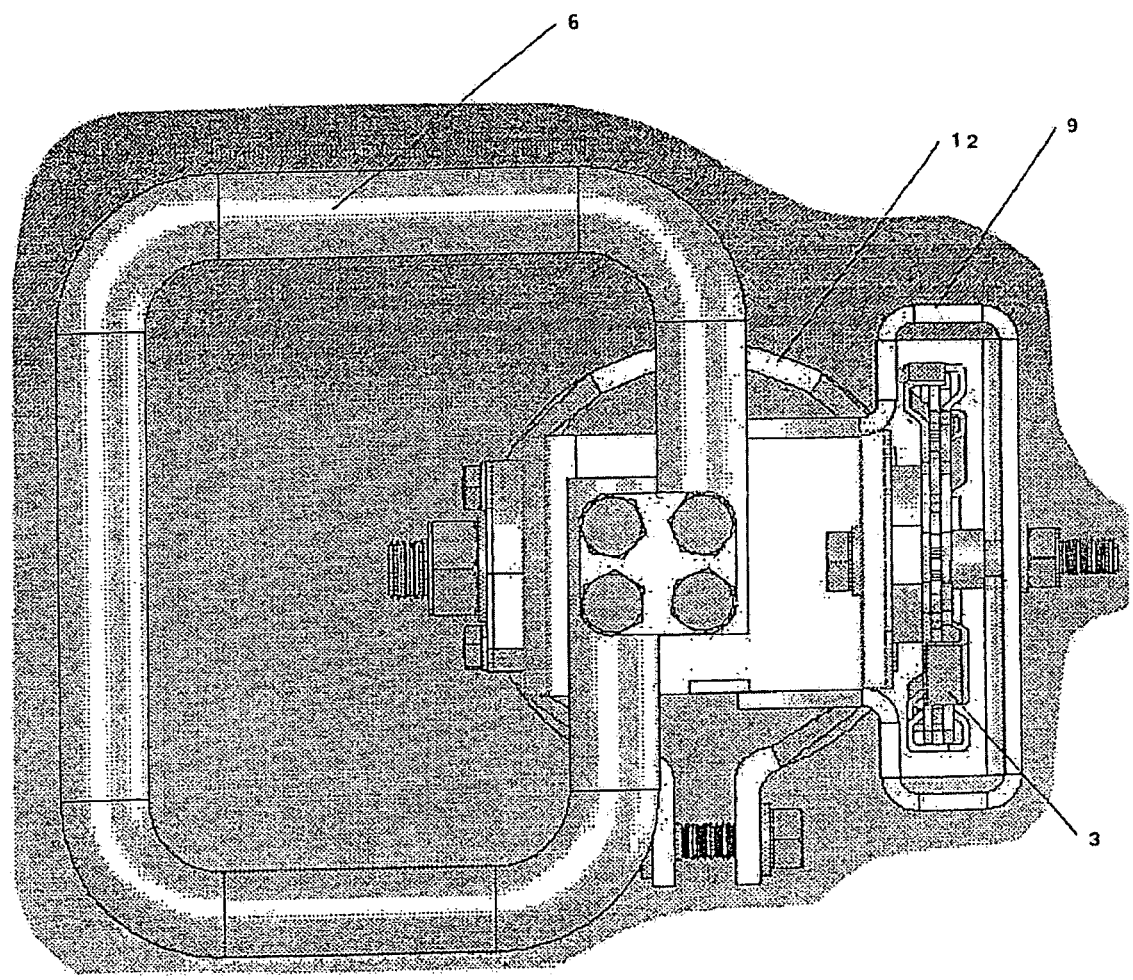

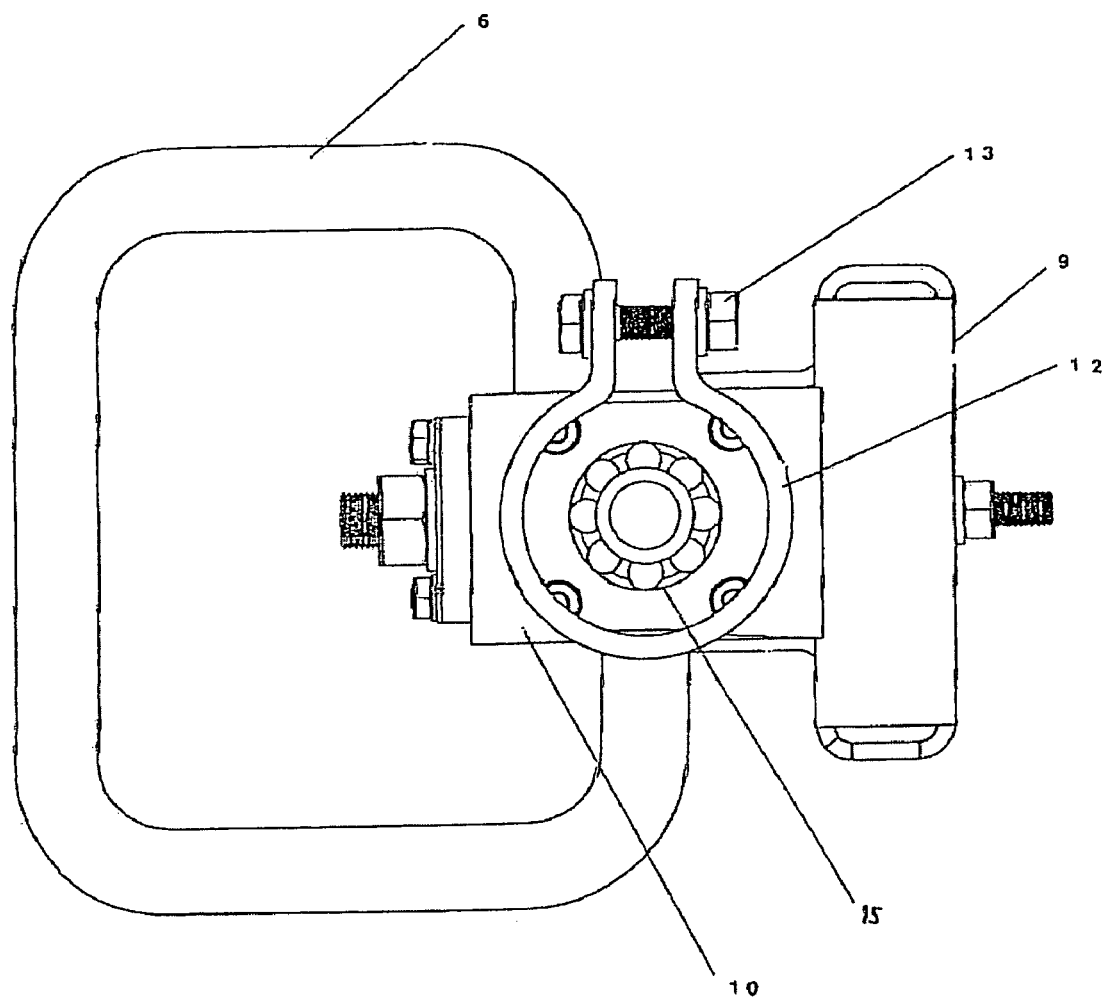
DRAWING 5

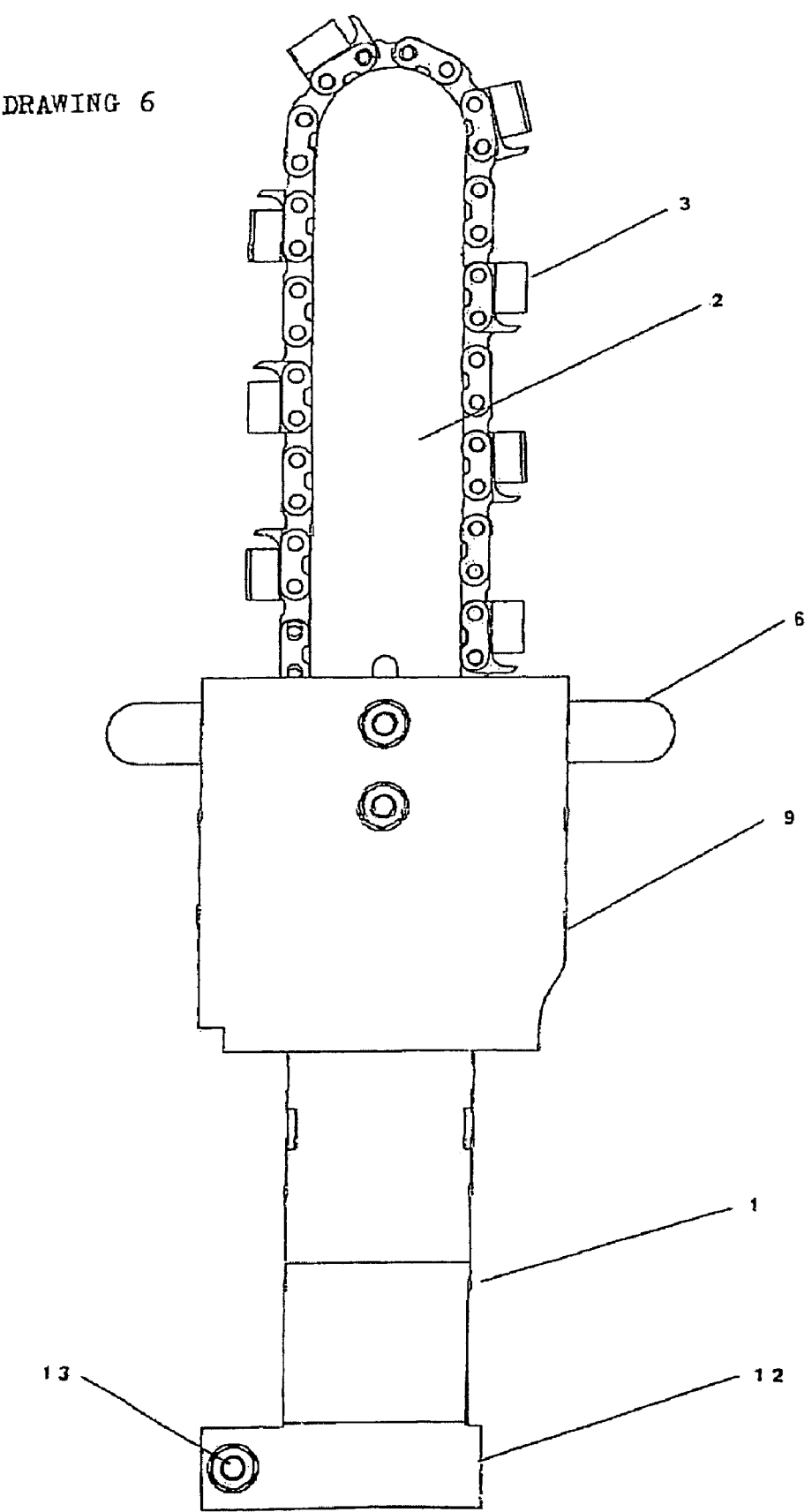
DRAWING 6

CHAIN SAW ATTACHMENT FOR A HAND DRILL

BACKGROUND OF THE INVENTION

1. The Field of the Invention

The following patent refers a hand drill machine, specifically, to a device for the attachment of a chain saw to a hand drill machine. The patent consists of an incontestable practicability accessory, which enable hand drills to have an additional function of a saw.

2. Description of the Related Art

During the development of this patent, a research was carried out on technical and economical viability of alternatives for following cutting mechanisms: abrasive cutting string, cutting tape and cutting chain.

The first of the three ones above mentioned bears the disadvantage of making the use of guides impossible, despite a small curvature radius and elevated resistance.

The second one does not enable the execution of curved cutting (even with the use of a largo sphere), although no high cutting power is required.

Therefore, the mechanism chosen is the same as the one already used in existing chain saws which presents the best cutting levels and benefit cost as well.

BRIEF DESCRIPTION OF THE DRAWINGS

The characteristics of the apparatus are related as follows, represented by illustrative titles and detailed description.
Drawing 1; the apparatus in perspective;
Drawing 2: a top-view of the apparatus;
Drawing 3: a sectioned top-view of the apparatus:
Drawing 4: the front-view of the apparatus;
Drawing 5: the rear-view of the apparatus attached to the drill;
Drawing 6: a side-view of the apparatus.

DETAILED DESCRIPTION OF THE INVENTION

So, in accordance with the drawings, the present patent is basically formed by a piece (1) destined for the attachment of the accessory to a hand drill, which can be operated either by electric or battery power. The cutting mechanism (2, 3), saber (2) and chain (3), pinion for traction transmission to the cutting chain (3); a set of conical gears (4, 5), for rotation transference from the hand drill, adjusting the necessary linear speed to the cut, in addition to a handle (6); which a protection cover can be added.

The primary shaft (7) connects the drill chuck and the conical gear (4); the secondary shaft (8) connects the pinion and the conical gear (5); the shield (9) protects the pinion white holding the lid (11) of the box (10) under pressure.

Piece (1)—destined for drill attachment (15), which can, for example, utilize the ring system (12) and the bolt (13)—is provided with lids. The box (10) and the piece (1) can turn into a single aluminum piece, of desired.

The invention claimed is:

1. A chain saw hand drill apparatus characterized as an attachment piece to a hand drill, which, through a shaft system, conical gears and pinion, moves the chain saw mechanism, also provided with a handle, the apparatus further characterized as a gearbox having lids, wherein the gearbox includes the conical gears comprising first and second bevel gears, the first bevel gear mounted to a shaft connected to the pinion, with a second bevel gear mounted to a shaft adapted to connect to the hand drill, the second bevel gear disposed between the pinion and the first bevel gear, wherein a pinion shield configured to cover the pinion is disposed opposite the first bevel gear and presses on the lids of the gearbox so as to press the first bevel gear against the second bevel gear for better power transmission.

2. A chain saw hand drill apparatus according to claim 1, wherein the attachment piece includes an opening on two sides to allow access to the shaft system.

3. A chain saw hand drill apparatus according to claim 1, further comprising a ring system and a bolt to secure the attachment piece to the hand drill.

* * * * *